United States Patent
Peres et al.

[11] Patent Number: 5,999,533
[45] Date of Patent: Dec. 7, 1999

[54] ATM CELL TRANSMIT PRIORITY ALLOCATOR

[75] Inventors: Mauricio Peres, Kanata; Hojjat Salemi, Nepean; Michel Laurence, Longueuil, all of Canada

[73] Assignee: Mitel Corporation, Kanata, Canada

[21] Appl. No.: 08/880,678

[22] Filed: Jun. 23, 1997

[30] Foreign Application Priority Data

Jun. 27, 1996 [GB] United Kingdom .................. 9613473

[51] Int. Cl.$^6$ .......................... H04L 12/28; H04Q 11/04
[52] U.S. Cl. ...................... 370/395; 370/412; 370/415; 370/60.1
[58] Field of Search .................................. 370/412, 468, 370/473, 474, 230, 395, 60.1, 85.6, 94.2, 235, 229, 236

[56] References Cited

U.S. PATENT DOCUMENTS

| | | | |
|---|---|---|---|
| 5,533,021 | 7/1996 | Branstad et al. | 370/60.1 |
| 5,696,764 | 12/1997 | Soumiya et al. | 370/395 |
| 5,748,614 | 5/1998 | Wallmeier | 370/235 |
| 5,805,590 | 9/1998 | Gillard et al. | 370/395 |
| 5,822,300 | 10/1998 | Johnson et al. | 370/229 |
| 5,848,068 | 12/1998 | Daniel et al. | 370/395 |

FOREIGN PATENT DOCUMENTS 0690596  11/1922  European Pat. Off. .

OTHER PUBLICATIONS

Singh S. "Round–Robin with Credits: An Improved Scheduling Strategy for Rate–Allocation in High–Speed Packet–Switching" Proceedings of the Global Telecommunications Conference (Globecom), Sand Francisco, Nov. 28–Dec. 2, 1994, pp. 334–338, XP000488568 Institute of Electrical and Electronics Engineeres p. 335, left–hand folumn, line 5—p.336, Left–hand column, line 19.

*Primary Examiner*—Michael Horabik
*Assistant Examiner*—Man Phan
*Attorney, Agent, or Firm*—Marks & Clerk

[57] ABSTRACT

A method of controlling the supply of cells into an asynchronous network, comprises the steps of storing incoming bytes from multiple channels in respective channel buffers, creating in memory a timing event wheel partitioned into a plurality of sectors, of which one is active at any time, and placing cell pointers in the sectors. The cell pointers identify channel buffers and are distributed around the wheel in accordance with a desired transmission schedule. The wheel is stepwise advanced at a predetermined rate, and the cell pointers in the active sector are scanned at each advance of the wheel to identify the corresponding channel buffers. The bytes from the identified channel buffers are assembled into cells, which are forwarded for transmission over the asynchronous network. These are then multiplexed with VBR cells from another source.

14 Claims, 3 Drawing Sheets

|  | 15 | 8 7 | 0 |
|---|---|---|---|
| +00 | Header Byte 0 | | Header Byte 1 |
| +02 | Header Byte 2 | | Header Byte 3 |
| +04 | HEC Byte | | Not Used |
| +06 | Not Used | | Not Used |
| +08 | Data Byte # 0 | | Data Byte # 1 |
| +0A | Data Byte # 2 | | Data Byte # 3 |
| +0C | Data Byte # 4 | | Data Byte # 5 |
| +0E | Data Byte # 6 | | Data Byte # 7 |
| +10 | Data Byte # 8 | | Data Byte # 9 |
| +32 | Data Byte # 42 | | Data Byte # 43 |
| +34 | Data Byte # 44 | | Data Byte # 45 |
| +36 | Data Byte # 46 | | Data Byte # 47 |
| +38 | Not Used | | Not Used |
| +3A | Not Used | | Not Used |
| +3C | Not Used | | Not Used |
| +3E | Not Used | | Not Used |

FIG.3

ATM CELL TRANSMIT PRIORITY ALLOCATOR

BACKGROUND OF THE INVENTION

This invention relates to asynchronous data networks, such as asynchronous transfer mode (ATM) networks, and in particular to a method of scheduling the supply of cells mixing different classes of traffic, for example voice and data.

ATM is an asynchronous packet switching network in which data packets are broken into fixed-length cells of 53 bytes each and sent over virtual circuits established between a pair of communicating devices. The virtual circuits can be either permanent or switched, in which latter case the virtual circuit is set up by the network manager at the time of placing a "call" between the sending and receiving ends.

Although ATM is fundamentally asynchronous in its operation, one of the features offered by ATM is the ability to provide constant bit rate (CBR) services between the endpoints. CBR is important for time sensitive data, such as voice and video. CBR can be achieved by controlling the supply of cells into the network, buffering the cells at the receiving end and creating an output bit stream clocked by signals recovered from the ATM network using known clock recovery techniques.

It is often desired to mix variable bit rate (VBR) traffic with the CBR traffic in order to optimize the use of available bandwidth. VBR traffic consists of data that is not time sensitive, for example, computer files and the like or signaling information.

One of the problems that arises is in the scheduling of traffic into the ATM network. CBR traffic, which is delay sensitive must given priority over VBR traffic. Various approaches are known for controlling the supply of VBR and CBR cells. For example, VBR traffic can be sent out using the leaky bucket algorithm. For each virtual circuit, credits accumulate up to a pre-programmed maximum value at the average cell transmission rate. Each time a cell is sent, a credit is removed until the packets are segmented or no credits are left. As long as credits exist, cells are transmitted at the peak rate. CBR traffic is handled by a simple backpressure mechanism. When a CBR cell shows up at the interface, the controller stops the VBR (AAL5) assembly engine and lets the CBR cell through. This does not permit user control over the sending of CBR cells, and in particular is unsuitable for managing multiple CBR circuits, for example, from an ST-BUS backplane.

An object of the invention is to alleviate this problem.

SUMMARY OF THE INVENTION

According to the present invention there is provided a method of controlling the supply of cells into an asynchronous network, comprising the steps of storing incoming bytes from multiple channels in respective channel buffers; creating in memory a timing event wheel partitioned into a plurality of sectors, of which one is active at any time; placing cell pointers in said sectors, said cell pointers identifying channel buffers and being distributed around said wheel in accordance with a desired transmission schedule; stepwise advancing said wheel at a predetermined rate; scanning said cell pointers in the active sector at each advance of said wheel to identify the corresponding channel buffers; assembling bytes from the identified channel buffers into cells; and forwarding the assembled cells for transmission over the asynchronous network.

The asynchronous network is preferably an asynchronous transfer mode network. The multiple channels can be the time division multiplexed channels on an ST-BUS operating at a framing rate of 8 KHz (125 $\mu$sec frame period). The assembled cells are then CBR (Constant Bit Rate) cells that can be multiplexed with VBR cells from a separate external source, for example a Segmentation and Re-assembly engine (SAR) receiving bursty traffic. The advance rate of each sector of the timing wheel should then be the same as the framing rate so that each sector remains active for 125 $\mu$secs.

The invention thus provides a programmable "task execution" manager which allows the user to handle the load over an ATM Transmit Segmentation and Reassembly engine (TXSAR) when assembling.ATM Cells for Constant Bit Rate (CBR) service, typically implemented by the ITU ATM Adaptation Layer 1 standards (AAL 1), defined in I .363.1 recommendations.

The task manager, which can be thought of in terms of a timing event wheel (TEW) by analogy to a mechanical system, allows the CBR port (such as a Mitel ST-BUS interface) and an asynchronous data transfer port (such as an ATM FORUM UTOPIA interface) to share a common output Mux with priority given to the CBR traffic. The task manager can also schedule CBR traffic with other VBR or ABR (Available Bit Rate) traffic from another internal source, for example, microprocessor assembled cells, according to a user-defined schedule, and then multiplex this scheduled traffic with VBR traffic from an external source, with the external traffic filling up the remaining time in each sector. Normally, priority is given to the traffic scheduled by the timing event wheel, but provision can be made to allow the user to override this normal priority so as to give temporary priority to the external traffic.

This invention thus allows the user to split access bandwidth between the CBR TXSAR and ATM cell access port for AAL 1 and AAL 5 traffic respectively, for example, in accordance with any desired schedule determined by the distribution of cell pointers around the timing event wheel.

In addition, the user can also add or drop CBR traffic from/to the task execution manager on-the-fly, and still sustain the traffic allocated to the data port.

Two methods of ATM cell transmit priority mechanisms are possible: round-robin or priority to the ACS (ATM Cell Segmentation) circuit, i.e. the circuit assembling cells in accordance with the invention.

The invention thus provides a robust and simple-way that multiple CBR channel (i.e. TDM) traffic can be scheduled for transmission in accordance with the requirements of the user over an ATM link.

The TEW has a programmable length from 1 to 256 sectors (events). The wheel can be used to assemble cells that follow the structured or unstructured data format specified in ITU I .363.1 (i.e. AAL-1 or AAL-0).

The invention also provides an apparatus for controlling the supply of cells into an asynchronous network, comprising a plurality of channel buffers for storing incoming bytes from multiple channels; a circular memory containing a timing event wheel partitioned into a plurality of sectors, of which one is active at any time, said sectors containing cell pointers identifying channel buffers and being distributed around said wheel in accordance with a desired user-defined transmission schedule; means for stepwise advancing said wheel at a predetermined rate; means for scanning said cell pointers in the active sector at each advance of said wheel to identify the corresponding active channel buffers; means for assembling bytes from the identified channel buffers into cells; and means for forwarding the assembled cell s to the asynchronous network.

BRIEF DESCRIPTION OF THE DRAWINGS

The invention will now be described in more detail, by way of example only, with reference to the accompanying drawings, in which:

FIG. 3 shows the format of a cell buffer; and

DESCRIPTION OF THE PREFERRED EMBODIMENTS

Figure 1:
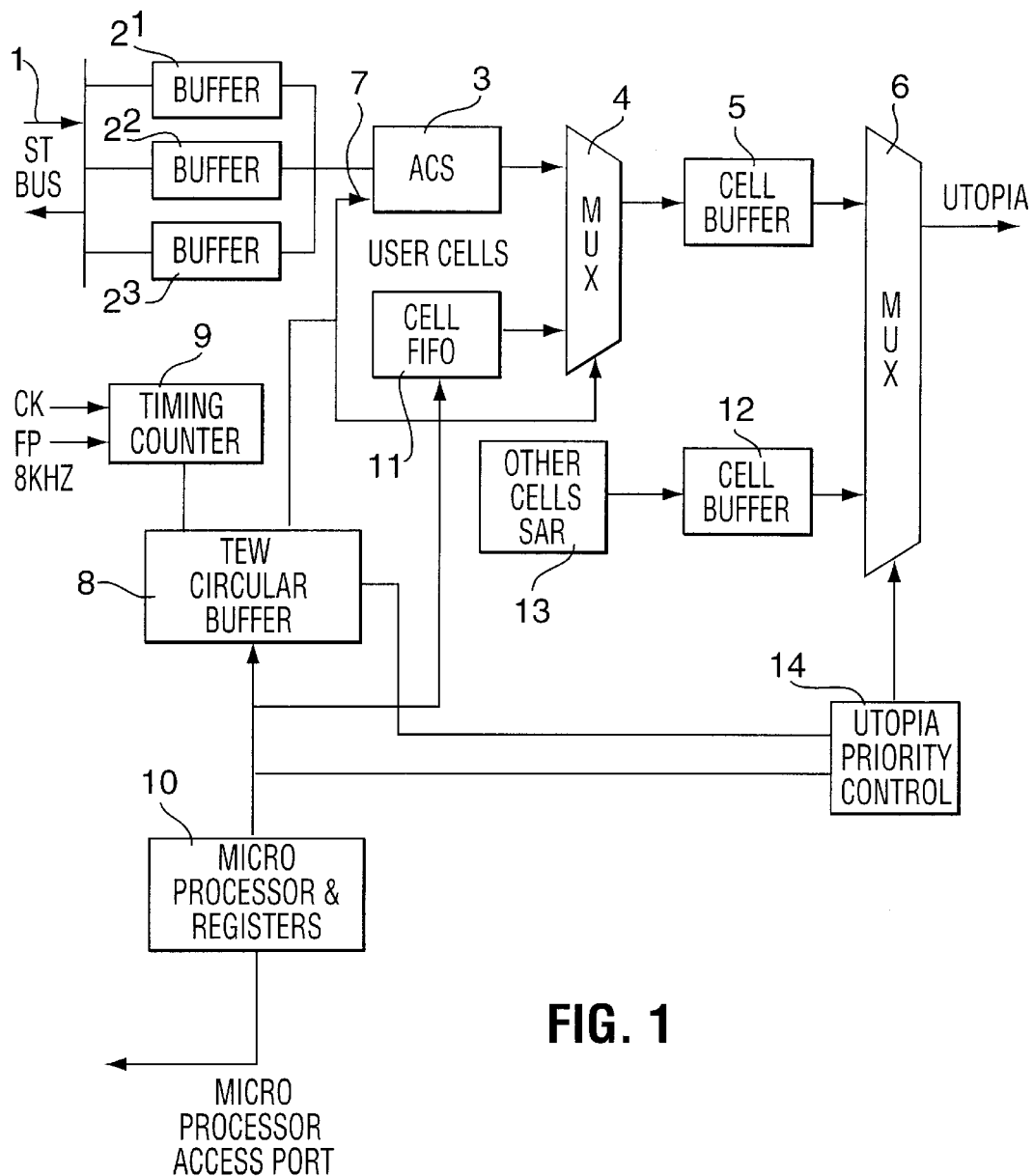
FIG. 1 is a block diagram of a system implementing the present invention.

FIG. 1 shows a block diagram of a system in accordance with the invention. User cells, for example, AAL-5 VBR cells containing signaling information or the like, are to be multiplexed with CBR cells in accordance with a predefined schedule while also allowing cells from an external source to pass through the asynchronous network.

FIG. 1 shows TDM traffic arriving on a Mitel ST-BUS 1, which could, for example, have 8 TDM multiplexed serial streams operating at 2, 4, or 8 Mbit/s. In the case of a 2 Mbit/sec bus, there are 32 channels in a 125 $\mu$sec frame. The channels on the ST-bus 1, which will be assumed to a 2 Mbits/sec bus, are fed into respective channel buffers 2, which contain sufficient bytes to assemble an ATM cell. An ATM cell has 53 bytes consisting of 48 payload bytes and five header bytes.

The outputs of the buffers 2 are fed to ACS (ATM cell segmenter) unit 3, which assembles CBR (Constant Bit Rate) cells for transmission to the Utopia port of an ATM network through Mux 4, cell buffer 5 and Mux 6.

The ACS unit 3 has an input 7 receiving instructions from a circular buffer 8, which forms a timing event wheel (TEW). This schedules the assembly of CBR cells and the forwarding of user cells. The cell pointer instructions identify the appropriate channel buffer 2 for the ACS unit 3 or the cell source.

ACS unit 3 assembles the bytes from the identified buffer 2 into CBR cells and feeds them to Mux 4, from where they are multiplexed with user cells from FIFO 11, also in accordance with instructions from the TEW buffer 8, and passed to cell buffer 5.

The circular buffer 8 has 47 memory sectors, each containing 64 cell pointers which identify the appropriate channel buffers 2 or cell source as will described in more detail below. The circular buffer 8 is stepwise advanced at the TDM framing rate (8 KHz) by the timing counter 9, which derives its timing signals CK and FP from the ST-bus 1, so as to make one sector active at a time for a period of 125 $\mu$sec, which corresponds to the TDM framing rate.

At each advance of the circular memory 8, the microprocessor 10 scans the cell pointers in the active sector. If the cell pointer corresponds to a CBR cell, the cell pointer instructions are passed to input 7 and cause the bytes from the identified channel buffers 2 to be fed to the ACS unit 3 for assembly into CBR cells. If the cell pointer corresponds to a user cell, Mux 4 passes cells from FIFO 11 to cell buffer 5.

The AAL-1 CBR cells from ACS unit 3 are multiplexed with user cells from cell FIFO 11 by Mux 4 in a sequence determined by the instructions contained in the active sector of the circular buffer 8. The user cells can be any type, for example, ABR cells or AAL-5 VBR cells that have been assembled by the microprocessor 10 or other device.

The cell pointers in the circular buffer 8 contain instructions for Mux 4, which multiplexes the CBR cells and user cells in accordance with the instructions stored in each memory sector. For example, the sequential cell pointers might, instruct ACS unit 3 to assemble two cells from buffer $2^1$, one cell from buffer $2^3$, and then instruct Mux to pass three user cells from FIFO 11. In an ATM network operating at 155 Mbits/sec, it is possible to assemble about 44 cells in each 125 $\mu$sec period. Thus during the remaining period that the sector in question remains active, the microprocessor 10 can send cells from cell buffer 12, which receives cells from SAR (segmenter and reassembler) unit 13. The other cells from SAR 13 are typically AAL-5 VBR cells, for example MPEG-2, signaling traffic etc.

Priority control unit 14, which controls output Mux 6, normally gives priority to cell buffer 5, but it also allows the microprocessor 10 to override the TEW scheduling in the event that urgent traffic needs to be sent.

The circular buffer 8, which contains the event timing wheel, can be programmed by the user through a keyboard or by loading appropriate software to distribute the supply of CBR cells and/or user cells throughout one rotation in accordance with the desired distribution of CBR cells into the ATM network. This allows the user to multiplex multiple CBR channels with user and cells from an external source according to any desired scheme so as to ensure timely delivery of the CBR cells while still making bandwidth available for the user cells and external cells.

In a practical example, the wheel has 47 sectors, each containing 64 cell pointers. Each cell pointer can point to a particular channel buffer 2. The user might program the wheel, for example, so that in sector 1, channels St01, St15, St27 were pointed to, in sector 2, channels St21, St10, St25, were pointed to and so on. The microprocessor 10 scans the active memory sector at very high rate, in the order of 60 MHz, for example, and causes the bytes in the identified channel buffers 2 to be passed to the ACS unit 3 for assembly into cells and transmission over the ATM. network through Mux 4 and Mux 6, which multiplexes the assembled CBR cells with the VBR cells from the external source 13. The user might also program the circular buffer so that in the first sector six ABR or VBR user cells are sent, in which case these cells are multiplexed with the CBR cells prior to entry into cell buffer 5 for input to the output Mux 6.

Figure 2:
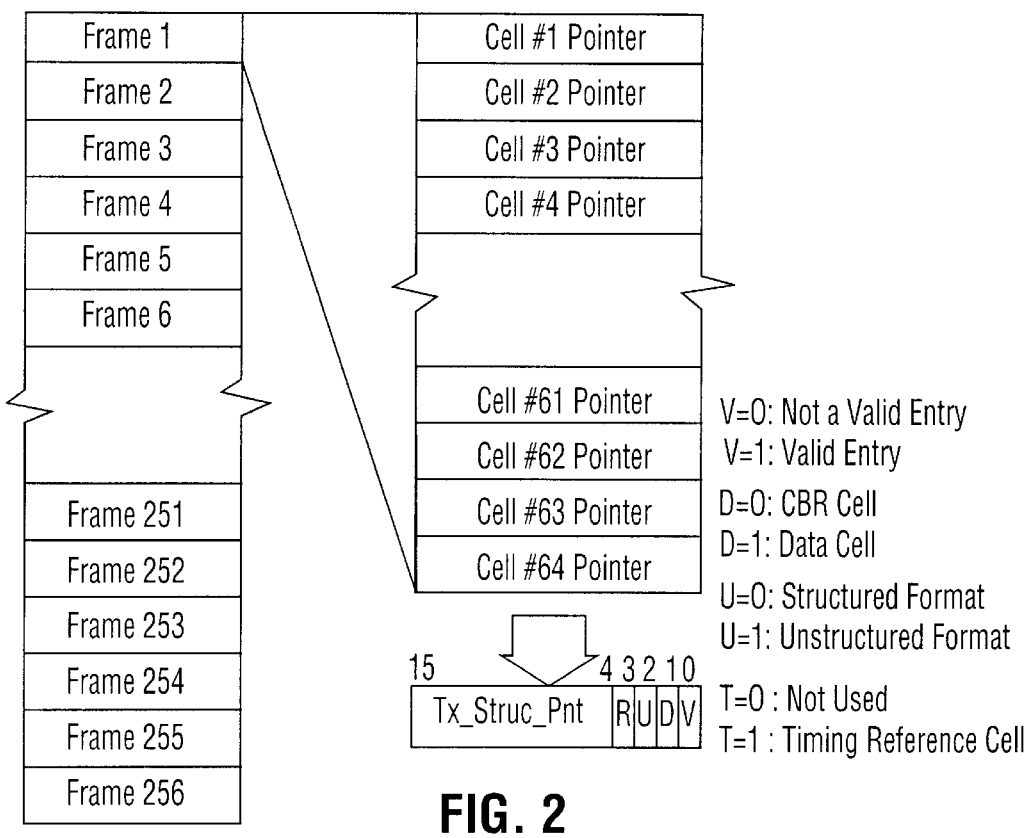
FIG. 2 shows the format of a Timing event wheel structure.

FIG. 2 shows the contents of the timing event wheel structure in more detail. In FIG. 2, 256 frames, which make up the maximum number sectors of the wheel, are shown. Each frame corresponds in timing to a TDM frame and in memory to a sector containing 64 cell pointers having the structure shown. Each cell pointer identifies a particular buffer 2 and also includes four bits, indicating whether it is a valid entry, whether the cell is a data cell or a CBR cell, whether it has a structured or unstructured format, and whether it is a timing reference cell.

Every 125 $\mu$s, the wheel is advanced by one frame. Each entry of the 64 entries of each frame of the wheel is scanned by the hardware at high speed. Whenever an entry is valid as indicated by the V bit (V=1), a cell will be processed, otherwise the entry is bypassed. The D (Data) bit indicates whether the cell is a user cell or a CBR cell. If it is a cell reserved for data (D=1), the Mux 4 is enabled to pass a user defined cell, usually an AAL-5 data cell from FIFO 11 to cell buffer 5. If it is a CBR cell, the ACS unit 3 assembles a CBR cell out of bytes drawn from the buffer 2 identified by the current cell pointer and passes this through Mux 4 to the cell buffer 5. It uses the Cell Transmit Information Structure Data, corresponding to buffer 2, pointed to by the Tx_Struct_Pnt pointer in FIG. 2 to know how to assemble the cell.

The timing event wheel is a powerful mechanism that can be used to schedule the transmission of different types of traffic into an ATM network, for example but not necessarily CBR traffic.

For example, a user might wish to open a Virtual Circuit (VC) for transmission, assign TDM channels to this VC, and schedule the necessary rate of transmission for this VC. The user sets up the proper control data structures in the TEW wheel 8 using either a keyboard or by loading software from a flash memory, for example.

For each VC, Cell Pointers are properly inserted in the timing wheel. For AAL-1 cells, for which the 47 byte payload is not partially filled whether structured or unstructured in format, it is simply a matter of inserting into the wheel the same number of cell pointers as there are distinct TDM channels assigned to the VC. For instance, if there is only one TDM channel assigned to a VC using an unstructured format, only one cell pointer needs to be present in one of the sectors of the 47 sectors of the event wheel. Since the wheel takes 47 frames (47×125 mS) to complete one rotation, one cell will be assembled every such period (5.875 mS) matching the TDM data generation rate and therefore adding no delay to the transmission of that CBR cell.

If a VC is assigned two TDM channels, two Cell Pointer entries will be inserted in the event wheel. Thus for every revolution of the wheel, two cells will be generated which is exactly the rate to match the TDM data generation rate.

In order to minimize cell delay variation at transmission, the Cell pointers need to be staggered evenly on the wheel so that cell transmission is evenly distributed in time. The process, which is used for transmission, is fully deterministic. The microprocessor can therefore insure an even time distribution of cell generation in the transmission process.

For partially filled ALL-1 cells, the event wheel dimension has to be an even multiple of the cell generation rate. For instance, assuming that VCs featuring a mixture of partially filled cells with respectively 6, 8, and 15 payload bytes (corresponding to the same number of TDM channels) per cell are required, and a wheel having 60 frames could be chosen. To support VCs with partially filled cells containing 6 payload bytes, 10 Cell Pointer entries would have to be put on the wheel, thus generating one cell every 750 $\mu$S and matching the TDM rate generation. To support VCs with partially filled cells containing 15 payload bytes, 4 Cell Pointer entries would have to be put on the wheel, thus generating on e cell every 1.875 mS and matching the TDM rate generation.

An interface with the memory controller (not shown) allows this module to request memory transfers to/from the external memory as required. An interface with the CPU 10 allows access to all internal registers, and internal control memory.

Figure 4:
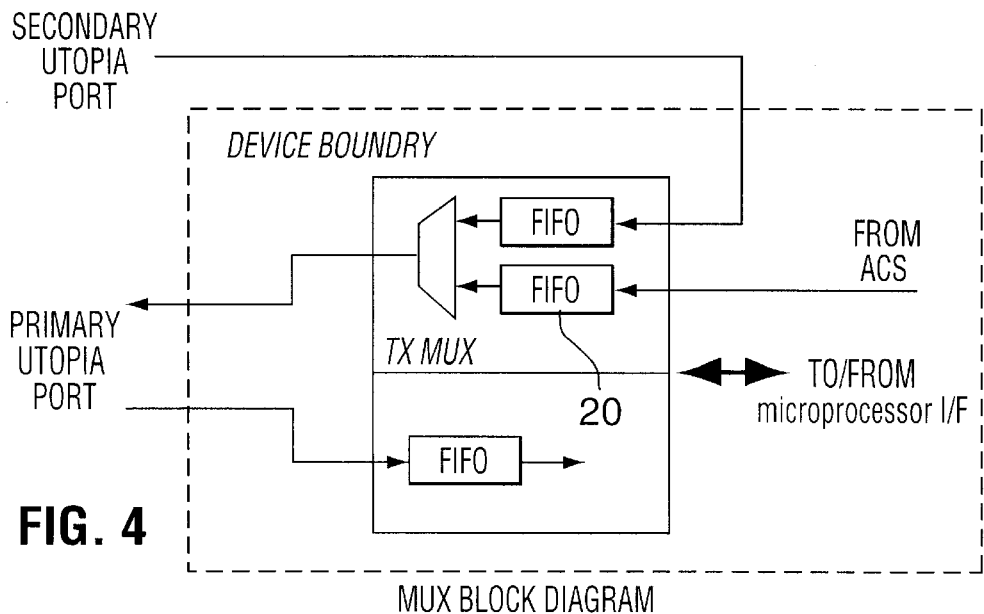
FIG. 4 is a block diagram of a mux for mixing VBR and CBR cells assembled in accordance with the invention.

The Mux unit 6 will be described in more detail with reference to FIG. 4. On the ATM transmit (Egress) side, the circuit muxes ATM cells from the cell buffer 5 with ATM cells coming from the secondary UTOPIA port, for example from SAR 13 in FIG. 1.

The MUX 6 normally gives priority to the cells from cell buffer 5. It fills the empty transmit cells slots with the traffic received from the external SAR device 13. The merged cell traffic is then forwarded to the PHY device over the primary UTOPIA interface for sending over the ATM network.

The MUX 6 supports two distinct UTOPIA (type 1) bi-directional busses. One UTOPIA bus connects to the external ATM PHY device. The other UTOPIA bus connects to the external SAR 13. In the latter case, the interface emulates a PHY device. Both buses can run up to 33 MHz and support cell level flow control. It also exchanges a few clock synchronization signals with the TDM module.

This operation of the Mux 6 is straightforward. It muxes on the primary UTOPIA bus cells from cell buffer 5 with cells received from the external SAR 13. A few register bits control the operation of the sub-module: a general enable; an external SAR interface enable; a mux arbitration method (priority to the ACS or round-robin); primary bus clock selection scheme: external UTOPIA clock, master clock divided by two or four. The small FIFOs (2 cells) are used to decouple the UTOPIA sub-module data path from the other modules.

In a general sense, the invention can provide a simple 2:1 ATM multiplexer circuit in an application whereby two traffic sources have different quality of service (QOS) requirements, such as voice and data. Voice traffic has to be allocated a fixed amount of bandwidth so that throughput delay is not accumulated in the mux circuit. Data traffic can be delayed without affecting the QOS. However, different priority data traffic could also be multiplexed, for example ABR and VBR cells.

It should be obvious that the above described embodiments are merely illustrative of the application and of the principles of the present invention, and numerous modifications thereof may be devised by those skilled in the art without departing from the spirit and scope of the invention.

We claim:

1. A method of controlling the supply of cells into an asynchronous network, comprising the steps of:
   a) storing incoming bytes from multiple time division multiplexed (TDM) channels in respective channel buffers;
   b) creating in memory a timing event wheel partitioned into a plurality of sectors, of which one is active at any time;
   c) placing cell pointers in said sectors, each said cell pointer identifying either a specific said channel buffer as a source of Constant Bit Rate (CBR) cells or an alternate source of cells to be multiplexed with said CBR cells, said cell pointers being distributed around said wheel in accordance with a desired transmission schedule;
   d) stepwise advancing said wheel at a predetermined rate corresponding to the TDM framing rate;
   e) scanning said cell pointers in the active sector at each advance of said wheel to identify the corresponding channel buffers or alternate source of cells;
   f) assembling bytes from the identified channel buffers into CBR cells; and
   g) forwarding the assembled CBR cells for transmission over the asynchronous network multiplexed with cells from said alternate source in accordance with said transmission schedule determined by said timing event wheel.

2. A method as claimed in claim 1, wherein said cell pointers include a validation bit, and cell pointers that do not have the validation bit set are ignored during said scanning step.

3. A method as claimed in claim 1, wherein said cell pointers also include additional bits identifying the source of cells to be passed to the asynchronous network.

4. A method as claimed in claim 3, wherein said user cells are multiplexed onto said network with said CBR cells in such a way that during each dwell period of said timing wheel, said CBR cells are transmitted first.

5. A method as claimed in claim 1, wherein the timing event wheel has a number of sectors at least equal to the number of payload bytes in the cell.

6. A method as claimed in claim 1, further comprising multiplexing cells whose transmission schedule is determined by said timing event wheel with cells from an external source during each dwell period, said cells identified by said source normally being given priority and the cells from the external source being sent during the remaining time available in each dwell period.

7. A method as claimed in claim 6, further comprising providing means to override the normal priority allocation under the control of the user.

8. An apparatus for controlling the supply of cells into an asynchronous network, comprising:
   a) a plurality of channel buffers for storing incoming bytes from multiple time division multiplexed (TDM) channels;
   b) a circular memory containing a timing event wheel partitioned into a plurality of sectors, of which one is active at any time, said sectors containing cell pointers identifying either a specific said channel buffer as a source of Constant Bit Rate (CBR cells or an alternate source of cells to be multiplexed with said CBR cells, said cell pointers being distributed around said wheel in accordance with a desired user-defined transmission schedule;
   c) means for stepwise advancing said wheel at a predetermined rate corresponding to the TDM framing rate;
   d) means for scanning said cell pointers in the active sector at each advance of said wheel to identify the corresponding active channel buffers or alternate source of cells;
   e) means for assembling bytes from the identified channel buffers into CBR cells; and
   g) a multiplexer for mulfiplexing said CBR cells with an alternate source of cells in accordance with instructions contained in said cell pointers and forwarding the assembled cells to the asynchronous network.

9. An apparatus as claimed in claim 8, further comprising means for reading said cell pointers to recognize a validation bit such that cell pointers that do not have the validation bit set are ignored during said scanning step.

10. An apparatus as claimed in claim 9, wherein said reading means further recognizes additional bits identifying the source of the cell to be transmitted over the network.

11. An apparatus as claimed in claim 8, wherein said user cells are multiplexed onto said network with said CBR cells in such a way that during each dwell period of said timing wheel, said CBR cells are transmitted first.

12. An apparatus as claimed in claim 8, further comprising a multiplexer for multiplexing the cells identified by said cell pointers with cells from an external source, said cells identified by the cell pointers normally being given priority.

13. An apparatus as claimed in claim 12, further comprising means for permitting the user to override said normal priority.

14. A method of controlling the supply of cells from multiple sources into an asynchronous network, comprising the steps of:
   a) creating in memory a timing event wheel partitioned into a plurality of sectors, of which one is active at any time;
   b) placing cell pointers in said sectors, said cell pointers identifying said sources and being distributed around said wheel in accordance with a desired transmission schedule;
   c) stepwise advancing said wheel at a predetermined rate;
   d) scanning said cell pointers in the active sector at each advance of said wheel to identify the corresponding sources; and
   e) forwarding cells from the indentified source for transmission over the asynchronous network.

* * * * *